United States Patent [19]

Chou et al.

[11] 4,100,043
[45] Jul. 11, 1978

[54] ATMOSPHERIC LEACH ION-EXCHANGE PROCESS FOR TREATING IRON-CONTAINING NICKEL-COPPER MATTE

[75] Inventors: Eddie C. Chou, Arvada; Paul B. Queneau, Golden; John M. Laferty, Wheatridge; John R. Carlberg, Arvada, all of Colo.

[73] Assignee: Amax Inc., Greenwich, Conn.

[21] Appl. No.: 724,380

[22] Filed: Sep. 17, 1976

[51] Int. Cl.² .............................................. C25C 1/12
[52] U.S. Cl. ..................................... 204/108; 75/119; 423/24; 423/41; 423/150
[58] Field of Search ...................... 423/24, 27, 25, 41, 423/150; 204/108, 112; 260/2.1 R, 2.2 R

[56] References Cited

U.S. PATENT DOCUMENTS

| 2,875,162 | 2/1959 | Morris | 260/2.2 R |
| 3,715,339 | 2/1973 | Rainer | 260/2.2 R |
| 3,914,374 | 10/1975 | Koehler | 423/27 |
| 3,962,051 | 6/1976 | Symens et al. | 204/108 |

OTHER PUBLICATIONS

Duolite CS-346 Tech. Sheet, Jun. 1, 1972, Diamond Shamrock Corp.
"Amberlite XE-318", Rohm and Haas, 1975.
Habashi, *Extractive Metallurgy*, Gordon & Breach, N.Y., 1970, (vol. II) pp. 175, 176, 184, 317, 318.
Mantell, *Industrial Electrochemistry*, (III Ed.), McGraw-Hill, Inc., 1950, pp. 270, 272, 280-282, 306, 307.
Hzkovitch et al., "Copper Removal From Thompson Nickel Anolyte by Solvent Extraction", *C.I.M. Bulletin*, Jan. 1974, pp. 92–96.

Primary Examiner—Brian Hearn
Attorney, Agent, or Firm—Michael A. Ciomek; Eugene J. Kalil

[57] ABSTRACT

A method is provided for leaching comminuted nickeliferous sulfide matte containing by weight about 20 to 75% nickel, about 5 to 50% copper, non-stoichiometric sulfur in the range of over 4 to about 24%, over 0.5 to about 20% iron, the sum of the nickel, copper and sulfur contents being at least about 80% of the matte composition, with the balance gangue or slag and incidental impurities.

Nickel is selectively leached from the comminuted matte using sulfuric acid or spent copper electrolyte solution at substantially atmospheric pressure while vigorously aerating the solution, wherein the pH is raised sufficiently to produce a nickel solution with an iron content of less than about 10 ppm and a copper content of over 5 ppm, the copper being thereafter selectively removed from the nickel solution by passing the solution through an ion-exchange resin selective to the absorption of copper.

4 Claims, 3 Drawing Figures

ATMOSPHERIC LEACH ION-EXCHANGE PROCESS FOR TREATING IRON-CONTAINING NICKEL-COPPER MATTE

This invention relates to a method of selectively leaching iron-containing nickeliferous sulfide matte and to a method for the continuous atmospheric leaching of iron-containing nickel-copper sulfide matte in the recovery of metal values therefrom in a multi-step process.

STATE OF THE ART

It is known to leach nickel selectively from comminuted nickeliferous sulfide matte containing copper, some iron, optionally some cobalt, and in which the sulfur content is non-stoichiometric relative to the total metal values present. Thus, in one preferred known method, a substantial portion of the nickel in the matte is selectively dissolved by subjecting the matte to atmospheric leaching in a sulfuric acid electrolyte at a temperature ranging up to about 100° C while aerating the solution. Aeration reduces the amount of iron in solution by rejecting the iron as a ferric precipitate. A bulk of the copper is also rejected.

The patent literature is replete with numerous hydrometallurgical processes for the selective leaching of nickel from nickeliferous sulfide matte, such as nickel sulfide and nickel-copper sulfide matte. As illustrative of patents in this technical area, reference is made to U.S. Pat. Nos. 967,072 (Aug. 9, 1910); 1,756,092 ((Apr. 29, 1930); 2,223,239 (Nov. 16, 1940); 2,239,626 (Apr. 22, 1941); and 2,753,259 (July 3, 1956). The last three patents point up the importance of employing matte in which the sulfur content of the matte is stoichiometrically less than the amount required to combine with all of the metal valves present.

In a technical paper entitled "Atmospheric Leaching of Matte at the Port Nickel Refinery" which appeared in the Canadian Mining and Metallurgical Bulletin (February, 1974), a detailed account is given on the atmospheric leaching of comminuted nickeliferous matte. Granulated matte was employed containing low iron (about 0.2% Fe), the matte being comminuted to 99% minus 100 mesh with 50% minus 400 mesh. With the low iron matte, relatively short leaching times were obtained.

Subsequent work on the atmospheric leaching of relatively high iron nickeliferous matte showed that the presence of high iron, e.g., iron contents in the matte of up to about 20% by weight, increased the retention time for obtaining nickel solutions low in both iron and copper, that is, solutions containing less than 10 ppm of each. See U.S. Pat. No. 3,962,051. In this Patent, the high iron matte is granulated from a temperature at least 10° above the liquidussolidus temperature by quenching in water to render the matte more leachable after comminution. According to the patent, the comminuted matte is subjected to a first stage atmospheric leaching step to dissolve nickel selectively therefrom by using a spent copper electrolyte solution containing sufficient sulfuric acid to provide a pH ranging up to about 2 while aerating the solution until the pH of said solution during leaching reaches a level of about 3.5 to 4.5, the first stage leach being followed by a second stage atmospheric leach in the spent copper electrolyte by replacing aeration with an appropriate quantity of a stronger oxidant, such as oxygen, $MnO_4^{-1}$ and $S_2O_8^{-2}$ to complete further the atmospheric leaching as evidenced by a rise in pH to over about 5 and thereby form a nickel solution low in both iron and copper. The second oxidation step with a stronger oxidant shortens the residence time substantially for completing the atmospheric leaching of the matte.

The iron is more easily rejected than the copper and, in order to assure rejection of copper to the desired low level, the residence time should be sufficient to take into account substantially complete rejection of copper.

However, the use of strong oxidants added to the cost of the process. Moreover, there was a tendency for the copper out of solution to oxidize and redissolve into the solution, particularly when an excessive quantity of the stronger oxidant was added. Thus, the conditions ideal for fast iron precipitation were not always ideal for fast copper precipitation. Increasing the residence time to completely reject copper also added to the cost since it had an adverse effect on high volumetric efficiency.

It would thus be desirable to provide a process sufficiently flexible for producing relatively pure nickel leach solutions low in iron and in copper without the necessity of rejecting both iron and copper simultaneously to the same low levels during leaching while maximizing the recovery of nickel, so long as the bulk of the copper is rejected.

We have found that this can be achieved by carrying out the atmospheric leach to reject the iron to the desired low level and thereafter complete the removal of copper from the nickel solution in an additional step using an ion exchange resin bed selective to the absorption of copper but not to nickel and/or cobalt.

OBJECTS OF THE INVENTION

It is thus an object of the invention to provide a method for the atmospheric leaching of nickeliferous sulfide matte containing relatively high iron to extract selectively and economically a substantial portion of the contained nickel low in iron and copper.

Another object of the invention is to provide a leaching process for the selective extraction of nickel from nickeliferous matte wherein the presence of iron and copper in either the matte and/or the leach solution and its adverse effect on the leaching can be compensated for by employing a novel combination of manipulative steps to effect the removal of substantially all of the iron in an aerating step and the removal of residual copper in another step.

These and other objects will more clearly appear when taken in conjunction with the following disclosure and the accompanying drawings.

SUMMARY OF THE INVENTION

Figure 1:
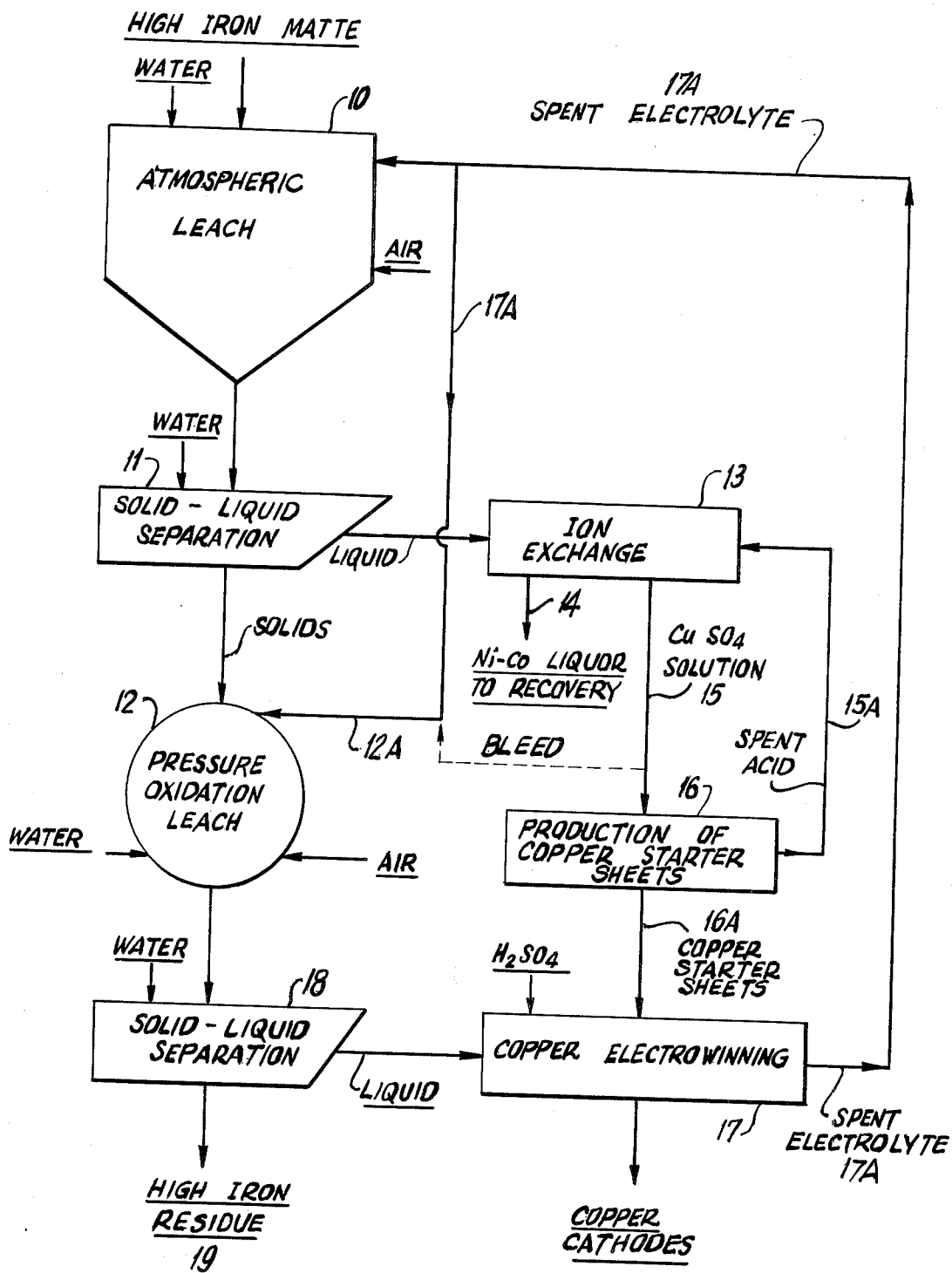
FIG. 1 is illustrative of one embodiment of a flow sheet for carrying out the invention.

The invention is directed to a process for leaching comminuted nickeliferous sulfide matte containing by weight about 20 to 75% nickel, about 5 to 50% copper, over 0.5 to 20% iron, optionally small amounts of cobalt, and nonstoichiometric sulfur ranging from over 4 to 24%, the sum of the nickel, copper and sulfur contents being at least about 80%. One embodiment of the invention resides in subjecting the comminuted matte to atmospheric leaching in a spent copper sulfate-sulfuric acid electrolyte of pH below 2 while vigorously aerating the solution to leach selectively nickel from said matte and produce a pregnant nickel solution containing less than about 10 ppm iron and containing copper in excess of about 5 ppm or 10 ppm, 20 ppm, or more, and leave a copper-nickel containing sulfide residue, separating the pregnant nickel solution from the residue, passing the pregnant solution through an ion-exchange bed selective to the absorption of copper, thereby removing the copper from said solution to a level below 5 ppm and then passing the nickel solution to nickel recovery.

By employing the foregoing process, excessive residence time is avoided during atmospheric leaching so long as substantially all of the iron is rejected to below 10 ppm. Special matte pretreatment is not necessary and it is not essential how the matte is granulated from the molten state. Strong oxidants need not be used so long as the aeration is conducted for sufficient time to reject substantially all of the iron from the solution, even though up to about 300 or 500 or 750 ppm copper remains in the solution.

Following rejection of the iron as a ferric precipitate (e.g., ferric hydroxide and/or hydrated oxide), the pregnant nickel solution containing residual copper (e.g., over 5 ppm) is filtered and then passed through an appropriate ion-exchange bed selective to the removal of copper from which solution substantially all of the copper is removed.

By avoiding extended leaching time to reject all of the copper in the leach solution, the subsequent removal of copper by ion-exchange permits use of almost 100% of all of the leach circuit's capacity for iron oxidation. In this connection, a series of aerated leaching tanks may be employed for carrying out of the atmospheric leaching of the comminuted matte in which the iron is rejected together with the bulk of the copper.

Ion exchange per se is a well known technique for selectively removing ions from solutions. For example, U.S. Pat. No. 2,831,763 (Apr. 22, 1958) suggests using this method for pretreating relatively dilute aqueous solutions of metals in order to concentrate the metal value in solution for subsequent autoclave reduction. However, in this patent, the metal leached from an ore is the primary raw material sought, not a by-product or impurity. Furthermore, the suggested recovery process utilizes autoclave reduction at elevated temperatures and superatmospheric pressures which are not required in the method of the present invention.

DETAILS OF THE INVENTION

In carrying out the atmospheric leach steps, recycle spent copper electrolyte is preferably employed as the leaching solution. The preferred embodiment of the invention resides in continuously feeding the granulated and ground high-iron matte along with spent electrolyte into the first of a series of stirred tanks. Percent solids in the slurry is preferably maintained at 10 to 20% and the slurry strongly aerated, preferably with the air dispersed by means of a single radial turbine rotating near the tank's bottom. The system is operated atmospherically (i.e., an open system) but with sufficient tank depth, e.g., 15 to 20 feet deep, to provide sufficient oxygen partial pressure around the turbine to meet requirements for rapid iron oxidation.

Oxygen-enriched air or pure oxygen could be substituted for air, but is not recommended for economic reasons. The main purpose of the invention is to avoid the expense of strong oxidants and yet maintain reasonable atmospheric leach retention time. The invention achieves rapid reaction rates without autoclaving. Likewise, there is no need for close temperature control during granulation of the matte nor for acid pre-leach treatment to remove iron as disclosed in U.S. Pat. No. 3,962,051.

The more effectively the spent electrolyte is aerated, the more rapidly iron is rejected. Increasing oxygen partial pressure by using oxygen further improves iron rejection rate. This is clearly apparent from the following table:

| Rate of Gas Injection, ml/min | Type of Gas | $O_2$ Partial Pressure Atm. | Time to Reject Iron, Hrs. |
|---|---|---|---|
| 100 | Air | 0.17 | 40. |
| 1600 | Air | 0.17 | 8. |
| 580 | $O_2$ | 0.82 | 2.5 |

The foregoing tests were performed in a 1 liter open flask at 75° C and 21% solids using ungranulated matte assaying 4.3% Fe, 39.6% Ni, 28.4% Cu and 22.8% S. The spent electrolyte assayed 22 gpl Cu, 31 gpl Ni and 46 gpl $H_2SO_4$.

Figure 2:
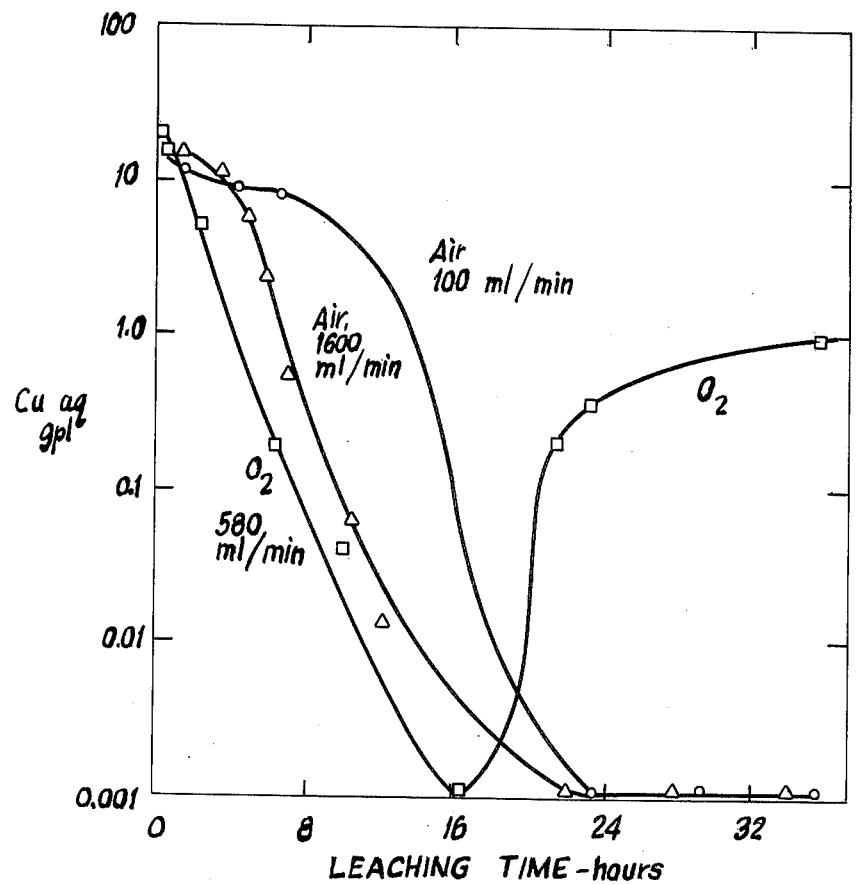
FIG. 2 depicts a group of curves each showing aqueous copper concentration in the leach liquor as a function of leaching time and degree of oxidation.

The behavior of aqueous copper is more complex than that of iron. Up to a certain oxygen partial pressure, strong aeration is beneficial. Above this partial pressure, copper will first precipiate and then redissolve. FIG. 2 illustrates this effect when treating the aforementioned matte, under conditions described in the previous paragraph.

As illustrative of the invention, the following example is given:

EXAMPLE

A matte containing 4.3% Fe, 39.6% Ni, 28.4% Cu and 22.8% S and comminuted to pass 200 mesh (U.S. Standard) with at least 50% passing through 270 mesh (slurried with process water at 40% solids), is treated with a spent electrolyte assaying 31 grams/liter (gpl) Cu, 70 gpl Ni, and 64 gpl $H_2SO_4$ and further treated in accordance with the flow sheet of FIG. 1. Thus, spent electrolyte and matte slurry are added to the first tank of a multi-tank leach train (for instance, five tanks of 15,000 gallons each) such that the percent solids in the first tank is about 15%. Leach train temperature is maintained at about 70° to 75° C, and each tank is aerated from the bottom of the tank. Thus, for 15 feet deep slurry, the air pressure at the outlet point of the gas input pipe corresponds to an oxygen partial pressure of about 0.3 atmosphere.

Referring to FIG. 1, the matte is substantially atmospherically leached at 10 for about 6 hours during which nickel is selectively dissolved and iron is rejected to below 5 ppm, the amount of copper assaying about 40 ppm. The pregnant solution assays about 65 gpl Ni and has a pH of about 5 to 5.5.

The pregnant solution and the sulfide residue are sent to solid-liquid separation at 11, the solids going to autoclave 12 for pressure oxidation with water and spent copper electrolyte as shown, the nickel solution low in iron going to ion-exchange bed in column 13 where the 40 ppm of copper in the solution is selectively absorbed by ion-exchange resin 13 and the copper in solution reduced to below 5 ppm. The nickel solution or liquor 14 which also contains some cobalt and which exits from the ion-exchange bed 13 is sent to nickel-cobalt recovery.

The copper in the resin bed is stripped by recycle solution 15A from the copper starter sheet tank 16 to which solution 15 from the ion exchange bed 13 is fed for producing copper starter sheet electrodes using titanium as a cathode from which the deposited starter sheet is strippable and an insoluble anode of lead. The copper starter sheet electrodes 16a are later transferred to the copper electrowinning tank 17 and are used to supply a portion of the starting cathodes needed for recovering copper from the high pressure leach solution following pressure leaching of the sulfide residue at autoclave 12 where the residue is mixed with spent electrolyte fed at 12a at a pulp density of about 20% solids, the pressure leaching being conducted in the presence of air at a pressure of about 600 psig total pressure and a temperature of about 180° C for about ½ hour adding sufficient sulfuric acid to maintain a pH of about 2 in the autoclave discharge.

Following pressure leaching, the charge is sent to liquid-solids separation at 18 and the residue disposed of at 19 and the separated liquid solution sent to copper electrowinning at 17 for recovery of copper. The solution assays about 70 gpl Ni, 60 gpl Cu and has a pH of about 2.

As the copper is plated out on the starter sheets, spent copper electrolyte 17a is formed which is recycled as shown to atmospheric leach 10 and to pressure oxidation leach 12.

As stated hereinabove, the ion-exchange bed employed is selective to the absorption of copper. After the ion-exchange circuit has reached a steady state, the acid regenerated at 16 is recycled as spend acid 15A to ion-exchange bed 13 for stripping the absorbed copper and regenerating the resin.

The exchange resins found effective for the process are as follows:

| Resin | Functional Group | Loading Capacity lbs Cu/ft Resin |
|---|---|---|
| Amberlite XE-318 | $RN(CH_2COOH)_2$ | 0.45 |
| Mitsubishi CR-20 | $RNH(C_2H_4NH)_nH$ | 0.82 |
| Duolite CS-346 | $RC(NH_2)NOH$ | 2.0 |

The R radicals represent polymeric resin structures and $n$ is an interger of 1 or above. The preferred polymeric resins comprise polymers and copolymers of vinyl aromatic compounds. Examples of such resins are polystyrene and a copolymer of polystyrene and divinyl benzene.

Figure 3:
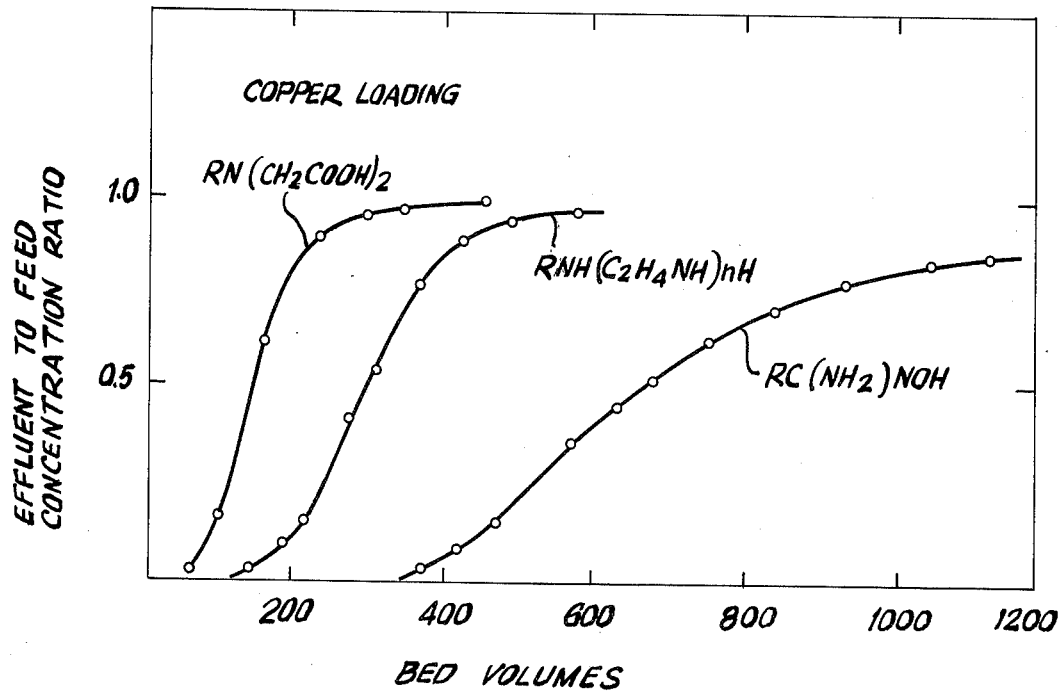
FIG. 3 shows a group of loading curves illustrating copper removal with three different ion exchange resins.

The breakthrough loading curves for the foregoing ion-exchange resins appear in FIG. 3. The CS-346 resin is particularly useful in that it has the highest loading capacity as its loading curve is farthest to the right. The data are based on retention times of about 14 minutes at about 23° C. The amount of solution treated is given in multiples of bed volumes, e.g. 200, 400, 600 etc.

A 2N $H_2SO_4$ solution readily strips the copper from the resins. Other ion-exchange resins selective to copper may be employed. Generally speaking, the sulfuric acid solution employed to strip the copper from the ion-exchange resin may range in concentration from about 0.5N to 10N.

In carrying out the high pressure leach on the copper-nickel sulfide residue, the feed pulp density may range from about 10 to 40% the amount of sulfuric acid added being sufficient to maintain the discharge pulp pH at about 2. The pulp is subjected to oxidation leach at an elevated temperature of about 150° to 250° C preferably 175° to 200° C and an elevated pressure of about 200 psig to 900 psig for about ¼ to 3 hours to form a pregnant solution containing copper and nickel which goes to the copper electrowinning tank.

The pregnant solution following high pressure leaching of the sulfide residue remaining from the atmospheric leach generally comprises about 60 to 90 gpl Ni and about 40 to 70 gpl Cu.

Following electrowinning, the spent electrolyte may contain about 60 to 90 gpl Ni, about 20 to 40 gpl Cu and about 10 to 90 gpl $H_2SO_4$.

The electrowinning of copper is well known and need not be discussed in detail here.

Although the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for leaching comminuted nickeliferous sulfide matte containing by weight about 20 to 75% nickel, about 5 to 50% copper, over 0.5 to 20% iron, and optionally small amounts of cobalt, and non-stoichiometric sulfur ranging from over 4 to 24%, the sum of the nickel, copper and sulfur contents being at least about 80% which comprises, subjecting said comminuted matte to atmospheric leaching in a spent copper electrolyte solution containing free sulfuric acid and having a pH below 2 while vigorously aerating said solution to leach selectively nickel from said matte and produce a pregnant nickel solution containing less than about 10 ppm iron and copper in excess of about 5 ppm and leave a copper-nickel containing sulfide residue, passing said pregnant solution through an ion-exchange resin bed selective to the absorption of copper and thereby remove the copper from said pregnant solution to below 5 ppm and form a copper-loaded resin bed, passing said pregnant solution from which copper has been removed to nickel-cobalt recovery, eluting said copper from said ion-exchange resin bed by passing a sulfuric acid-containing solution therethrough of pH below 2 and thereby produce a copper sulfate-sulfuric acid electrolyte, producing copper starting sheet electrodes from said electrolyte for use as cathodes in the electrowinning of copper from copper sulfate-sulfuric acid leach solution, subjecting the copper-nickel containing sulfide residue remaining from said atmospheric leach to leaching with a spent copper sulfate-sulfuric acid electrolyte at elevated temperature and pressure to form a pregnant copper-containing electrolyte, subjecting said pregnant copper-containing electrolyte to electrowinning to recover cathode copper therefrom and form a spent copper sulfate-sulfuric acid electrolyte solution, and recycling said spent copper electrolyte solution to said atmospheric leaching step.

2. The process of claim 1, wherein the pregnant nickel solution obtained in the atmospheric leach contains over 5 ppm to about 750 ppm copper.

3. The process of claim 1, wherein said ion-exchange resin is selected from the group consisting of $RN(CH_2COOH)_2$, $RNH(C_2H_4NH)_nH$ and $RC(NH_2)NOH$, where R comprises polymers and copolymers of vinyl aromatic compounds and $n$ is an integer of 1 or above.

4. A process for leaching comminuted nickeliferous sulfide matte containing by weight about 20 to 75% nickel, about 5 to 50% copper, over 0.5 to 20% iron, optionally small amounts of cobalt, and non-stoichiometric sulfur ranging from over 4 to about 24%, the sum of the nickel, copper and sulfur contents being at least about 80% which comprises, subjecting said comminuted matte to atmospheric leaching in a spent copper electrolyte-sulfuric acid solution of pH below 2 while vigorously aerating said solution to leach selectively nickel from said matte and produce a pregnant nickel solution containing less than about 10 ppm iron and copper ranging from over 5 ppm to about 750 ppm and leaving a copper-nickel-containing sulfide residue, separating said pregnant nickel solution from said copper-nickel-containing sulfide residue, passing said pregnant nickel solution through an ion-exchange resin bed selective to the absorption of copper selected from the group consisting of $RN(CH_2COOH)_2$, $RNH(C_2H_4NH)_nH$ and $RC(NH_2)NOH$, where R comprises polymers and copolymers of vinyl aromatic compounds and $n$ is an integer of 1 or above, thereby removing said copper from said solution with a purified nickel solution going to nickel recovery, eluting said copper from said ion-exchange resin bed by passing a sulfuric acid solution therethrough of pH below 2 and thereby produce a copper sulfate-sulfuric acid electrolyte, producing copper starting sheet electrodes from said electrolyte for use as cathodes in the electrowinning of copper, subjecting said copper-nickel sulfide residue from said atmospheric leach to high pressure oxidation leach with a sulfuric acid-containing solution at a temperature of about 150° to 250° C and a pressure of about 200 to 900 psig and thereby produce a pregnant copper sulfate-containing electrolyte and a leached residue which is removed, subjecting said pregnant copper sulfate-containing electrolyte to electrowinning to recover copper therefrom and form a spent copper electrolyte with regenerated sulfuric acid, and recycling said spent copper electrolyte into said leaching process.

* * * * *